US008039093B2

(12) United States Patent
Leenders et al.

(10) Patent No.: US 8,039,093 B2
(45) Date of Patent: Oct. 18, 2011

(54) METHOD FOR PREPARING TAMPERPROOF ID DOCUMENTS

(75) Inventors: Luc Leenders, Herentals (BE); Eddie Daems, Herentals (BE)

(73) Assignee: Agfa-Gevaert N.V., Mortsel (BE)

( * ) Notice: Subject to any disclaimer, the term of this patent is extended or adjusted under 35 U.S.C. 154(b) by 1198 days.

(21) Appl. No.: 11/582,262

(22) Filed: Oct. 17, 2006

(65) Prior Publication Data

US 2007/0092703 A1 Apr. 26, 2007

Related U.S. Application Data

(60) Provisional application No. 60/736,063, filed on Nov. 10, 2005.

(30) Foreign Application Priority Data

Oct. 21, 2005 (EP) ..................................... 05109833

(51) Int. Cl.
*B41M 5/00* (2006.01)
*B44C 1/17* (2006.01)
*G03G 7/00* (2006.01)

(52) U.S. Cl. ..................... 428/195.1; 428/413; 428/447; 428/913.3

(58) Field of Classification Search ............... 428/195.1, 428/413, 447, 913.3
See application file for complete search history.

(56) References Cited

U.S. PATENT DOCUMENTS

| 4,425,421 | A * | 1/1984 | Rutges et al. ................. 430/238 |
| 5,614,289 | A | 3/1997 | Kobayashi et al. |
| 6,461,419 | B1 | 10/2002 | Wu et al. |
| 2003/0007050 | A1 | 1/2003 | Wu et al. |
| 2003/0031843 | A1 | 2/2003 | Wu et al. |
| 2004/0024089 | A1 | 2/2004 | Busch et al. |
| 2004/0050292 | A1 | 3/2004 | Nakajima et al. |
| 2004/0052967 | A1 | 3/2004 | Takabayashi |
| 2005/0042396 | A1 | 2/2005 | Jones et al. |
| 2006/0086281 | A1 * | 4/2006 | Poulet et al. ................. 106/14.5 |

FOREIGN PATENT DOCUMENTS

| EP | 0 189 125 A1 | 7/1986 |
| EP | 0 825 218 A1 | 2/1998 |
| EP | 1 344 805 A1 | 9/2003 |
| EP | 1 398 175 A2 | 3/2004 |
| EP | 1 586 459 A1 | 10/2005 |
| FR | 2 837 218 A1 * | 9/2003 |
| WO | WO 99/06336 A1 | 2/1999 |
| WO | WO 01/32789 A1 | 5/2001 |
| WO | WO 03/061970 A2 | 7/2003 |

OTHER PUBLICATIONS

European Search Report EP 05 10 9833 (Mar. 22, 2006).
Crivello, J.V. et al.; Photoinitiators for Free Radical Cationic & Anionic Photopolymerization; vol. III, $2^{nd}$ Edi. G. Bradley (Edition) ; pp. 275-298 (1998).
Mc Cutcheon'S, *Functional Materials*, North American Edition, 110-129 (1990).

* cited by examiner

*Primary Examiner* — Betelhem Shewareged
(74) *Attorney, Agent, or Firm* — Leydig, Voit & Mayer, Ltd.

(57) ABSTRACT

A method for preparing a tamperproof ID document comprising in order the steps of a) providing an ID document having at least one image on at least one outermost surface of said ID document; b) printing or coating a curable liquid on at least one of said outermost surfaces of said ID document thereby forming an outermost layer on said printed or coated outermost surface at least partially covering said at least one image; and c) curing said outermost layer; wherein said curable liquid comprises a polymerizable and/or a polymeric abherent agent and said printed or coated outermost surface is the surface of a layer or foil exclusive of porous pigment. Also disclosed is an ID document wherein the surface of an outermost layer at least partially covering an image on the ID document has a surface energy of less than 28 mN/m; and the use of an abherent agent-comprising curable composition to provide ID-documents with a substantially non-printable and substantially non-laminatable abhesive surface.

20 Claims, No Drawings

METHOD FOR PREPARING TAMPERPROOF ID DOCUMENTS

CROSS-REFERENCE TO RELATED PATENT APPLICATIONS

This application claims the benefit of U.S. Provisional Application No. 60/736,063 filed Nov. 10, 2005, which is incorporated by reference. In addition, this application claims the benefit of European Application No. 05109833.3 filed Oct. 21, 2005, which is also incorporated by reference.

FIELD OF THE INVENTION

The invention relates to a method for preparing identification documents by ink-jet printing secured against alteration.

BACKGROUND OF THE INVENTION

US 2004/024089A1 relates to the use of epoxypolysiloxanes modified with oxyalkylene ether groups as additives for cationically radiation-curing coatings and discloses a coating, printing ink or paint varnish that is curable cationically by radiation, which comprises a compound that contains epoxy, oxirane and/or vinyl groups and an additive comprising at least one epoxypolysiloxane which is modified with oxyalkylene ether groups and contains attached to an Si atom of the epoxypolysiloxane, at least one group of the formula $-R^3-O-(C_nH_{(2n-m)}R^4_mO-)_xR^5$ (I) in which $R^3$ is a divalent, unsubstituted or substituted alkyl or alkylene radical, n is 2 to 8, m is 0 to 2n, x has a value of 1 to 200, and $R^4$ stands for identical or different alkyl radicals having or for identical or different, unsubstituted or substituted phenyl radicals, $R^5$ is a hydrogen, an unsubstituted or substituted alkyl radical, an acyl radical or a radical $-O-CO-NH-R^6$, in which $R^6$ is an unsubstituted or substituted alkyl or aryl radical, it being possible for the oxyalkylene segments $-(C_nH_{(2n-m)}R^4_mO-)$ within one oxyalkylene ether radical to be different from one another and for the sequence of the individual oxyalkylene segments $-(C_nH_{(2n-m)}R^4_mO-)$ to be arbitrary, random polymers, or combinations thereof.

WO 01/32789A relates to moisture-curable ink compositions and discloses a cure-on-demand curable ink composition comprising a homogeneous mixture of: at least one of: (a) a compound having 2 reactive silyl groups, and (b) a compound having at least 3 reactive silyl groups; acid generating catalyst; and pigment or pigment chip.

US 2004/050292A1 discloses a photocurable ink for ink-jet recording, comprising an oxetane compound having a substituent at the 2-position of the molecule and US 2004/052967A1 discloses an actinic ray curable composition containing a photo acid generator, and an oxetane compound I represented by the following formula 1

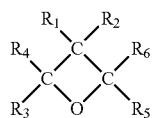

wherein $R_1$, $R_2$, $R_3$, $R_4$, $R_5$, and $R_6$ independently represent a hydrogen atom, a fluorine atom, an alkyl group having from 1 to 6 carbon atoms, a fluoroalkyl group having from 1 to 6 carbon atoms, an allyl group, an aryl group, a furyl group or a thienyl group, and wherein the longer C—O bond distance of the two C—O bond distances in formula 1 is from 0.1464 to 0.1500 nm Identification documents are used on a daily basis to prove identity, to verify age, to access a secure area, to provide evidence of driving privileges, to cash a check, to make payments, to access an automated teller machine(ATM), to debit an account and so on. Airplane passengers are required to show an identification document (hereafter "ID document") during check in, security screening and prior to boarding their flight. Since they play a critical role in today's society, it is essential that ID documents cannot be falsified and are tamperproof.

Identification cards and documents, such as driving licenses, national or government identification cards, bank cards, credit cards, controlled access cards and smart cards, carry certain items of information which relate to the identity of the bearer. Examples of such information or variable data include name, address, date of birth, signature and photo of the bearer. The ID cards or documents may in addition carry invariant data, i.e., data common to a large number of cards, for example the name of an employer, the name of the issuing authority and the name of a country.

Ink-jet printing is very suitable for handling variable data, particularly at the issuing locality. Also due to the compactness of ink-jet printers, it has become one of the preferred printing techniques for manufacturing ID documents. Ink-jet printing can be used to assemble identification cards as disclosed, for example, in US 2005/042396A1 using pigmented ink-jet inks for printing the variable data, but it is also possible to use ink-jet printing to introduce security features.

EP-A 1 398 175 discloses an information carrier comprising: a rigid sheet or web support; an opaque porous receiving layer capable of being rendered substantially transparent by penetration by a lacquer, said receiving layer containing a pigment and a binder; an image provided onto and/or in said receiving layer; a cured pattern of a varnish provided onto said receiving layer provided with said image or onto and/or in said receiving layer provided with said image if said varnish is incapable of rendering said receiving layer transparent; and a cured layer of said lacquer provided on said receiving layer provided with said image and said cured pattern of said varnish, said lacquer having rendered said parts of said receiving layer in contact therewith substantially transparent, wherein said cured pattern of said varnish forms an opaque watermark. The watermark ir produced by patternwise penetration of a UV-curable lacquer into a porous opaque receiving layer.

Another security measure used in ID documents is the application of a transparent or translucent layer which is difficult or impossible to remove from the surface of the image-receiving layer, thereby securing the data printed on the image-receiving layer. Such layers can be applied to ID documents using UV-curable liquids as disclosed in EP-A 0189125 and U.S. Pat. No. 5,614,289.

However the availability of cheap digital printing systems such as ink-jet printers also led to a new type of fraudulent action on ID documents. Overprinting and over-labelling of the personalised information, such as the common "photo swap", method, allows easy and fast abuse of a stolen ID document.

Therefore, it is highly desirable to be able to manufacture ID documents secured against alteration using a simple manufacturing method and a compact apparatus

ASPECTS OF THE INVENTION

It is an aspect of the present invention to provide a simple method for manufacturing a secure ID document with a compact apparatus.

It is a further aspect of the present invention to provide ID documents, which are difficult to falsify and are tamperproof.

Further objects of the invention will become apparent from the description hereinafter.

SUMMARY OF THE INVENTION

It has been surprisingly found that a tamperproof ID document was obtained by jetting and curing a thin outermost layer comprising an abherent agent on top of an ID document whereby the resulting layer did not change the look and feel of the ID document and all attempts to superimpose information on the image by writing on it, printing with toner or jetting ink-jet inks on the outermost layer failed. The resulting outermost layer surprisingly exhibiting no problems of adhesion to the non-porous pigment-containing surface of an ID document, although exhibiting abhesive properties to labels being applied to its surface.

Aspects of the present invention have been realized by a method for preparing a tamperproof ID document comprising in order the steps of a) providing an ID document having at least one image on at least one outermost surface of said ID document;
b) printing or coating a curable liquid on at least one of said outermost surfaces of said ID document thereby forming an outermost layer on said printed or coated outermost surface at least partially covering said at least one image; and
c) curing said outermost layer;
wherein said curable liquid comprises a polymerizable and/or a polymeric abherent agent and said printed or coated outermost surface is the surface of a layer or foil exclusive of porous pigment.

Aspects of the present invention have also been realized by an ID document wherein the surface of an outermost layer at least partially covering an image on said ID document has a surface energy of less than 28 mJ/m$^2$.

Aspects of the present invention have also been realized by the use of an abherent agent-comprising curable composition to provide ID-documents with a substantially non-printable and a substantially non-laminatable abhesive surface.

Further advantages and embodiments of the present invention will become apparent from the following description.

DETAILED DESCRIPTION OF THE INVENTION

Definitions

The term "abherent agent", as used in disclosing the present invention means a substance that prevents adhesion of a material, either to itself or to other materials.

The term "printing", as used in disclosing the present invention, means application by a conventional impact or non-impact printing process including but not restricted to ink-jet printing, intaglio printing, screen printing, flexographic printing, offset printing, stamp printing and gravure printing.

The term "identification document" or "ID document", as used in disclosing the present invention means a document bearing identifying data about the product or the individual whose name appears thereon. ID documents include credit cards, bank cards, phone cards, passports, driving licences, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards and badges. The terms "document," "card," "badge" and "documentation" are used interchangeably throughout this patent application.

The term "image", as used in disclosing the present invention means any way of representing information, such as pictures, logos, photographs, barcodes and text. The image may also comprise some form of a "security pattern", such as small dots, thin lines, holograms, microprint and Moire inducing patterns which may be produced using fluorescent inks, phosphorescent inks, pearlescent inks or other optically variable inks, such as metameric inks.

The term "ink", as used in disclosing the present invention, means a liquid which can be printed using conventional printing techniques and is not confined to liquids containing at least one colorant.

The term "substantially non-printable abhesive surface", as used in disclosing the present invention, means a surface which does not lend itself to efficient deposition of an ink by a conventional printing technique and/or to deposits of ink with substantially no adhesion to the abhesive surface.

The term "substantially non-laminatable abhesive surface", as used in disclosing the present invention, means a surface which does not lend itself to efficient lamination and/or to laminates with substantially no adhesion to the abhesive surface.

The term "porous pigment", as used in disclosing the present invention, means a pigment with detectable pores detectable using techniques such as porosimetry i.e. contains pores in an open (unfilled) state. These pores can be micropores defined by IUPAC as pores sizes <2 nm, mesopores defined by IUPAC as pore sizes of 2 to 50 nm or macropores defined by IUPAC as pore sizes greater than 50 nm. Porous pigments often have very high specific surface areas (BET) e.g. 100 to greater than 1500 m$^2$/g associated with particle sizes greater than 1 μm and have measurable pore volumes e.g. 1.2 mL/g for SYLOID™ W300. Examples of porous pigments are silica gels such as SIPERNAT™ 570, SIPERNA™ 700 and SIPERNAT™ 220 from Degussa and SYLOID™ W300 from W. R. Grace.

A "layer or foil exclusive of porous pigment", as used in disclosing the present invention, means a layer or foil which does not contain porous pigment particles i.e. porous particles containing pores in an open (unfilled) state and does not include a layer or foil containing porous pigment, whose pores have been filled e.g. with a curable liquid.

The term "UV" as used in disclosing the present invention is an abbreviation for ultraviolet radiation.

The term "ultraviolet radiation" as used in disclosing the present invention means electromagnetic radiation in the wavelength range of 100 to 400 nanometers.

The term "actinic radiation" as used in disclosing the present invention means electromagnetic radiation capable of initiating photochemical reactions.

The term "Norrish Type I initiator" as used in disclosing the present invention, means an initiator which cleaves after excitation, yielding the initiating radical immediately.

The term "Norrish Type II initiator" as used in disclosing the present invention, means an initiator which in its excited state forms free radicals by hydrogen abstraction or electron extraction from a second compound that becomes the actual initiating free radical.

The term "photo-acid generator" as used in disclosing the present invention, means an initiator which generates an acid or hemi-acid upon exposure to actinic radiation.

The term "thermal initiator" as used in disclosing the present invention means an initiator which generates initiating species upon exposure to heat.

The term "functional group" as used in disclosing the present invention means an atom or group of atoms, acting as a unit, that has replaced a hydrogen atom in a hydrocarbon molecule and whose presence imparts characteristic properties to this molecule. The term "polyfunctional" means more than one functional group. The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

The term "dispersion", as used in disclosing the present invention, means an intimate mixture of at least two substances, one of which, called the dispersed solid phase or colloid, is uniformly distributed in a finely divided state through the second substance, called the dispersion medium.

The term "polymeric dispersant", as used in disclosing the present invention, means a polymeric substance for promoting the formation and stabilization of a dispersion of one substance in a dispersion medium.

The term "wt %" is used in disclosing the present invention as an abbreviation for % by weight.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethylpropyl, 2,2-dimethylpropyl and 2-methylbutyl etc.

The term "acyl group" means —(C=O)-aryl and —(C=O)-alkyl groups.

The term "aliphatic group" means saturated straight chain, branched chain and alicyclic hydrocarbon groups The term "aromatic group" as used in disclosing the present invention means an assemblage of cyclic conjugated carbon atoms, which are characterized by large resonance energies, e.g. benzene, naphthalene and anthracene.

The term "alicyclic hydrocarbon group" means an assemblage of cyclic carbon atoms, which do not form an aromatic group, e.g. cyclohexane.

The term "substituted" as used in disclosing this present invention means that one or more of the carbon atoms and/or that a hydrogen atom of one or more of carbon atoms in an aliphatic group, an aromatic group or an alicyclic hydrocarbon group, are replaced by an oxygen atom, a nitrogen atom, a halogen atom, a silicon atom, a sulphur atom, a phosphorous atom, selenium atom or a tellurium atom. Such substituents include hydroxyl groups, ether groups, carboxylic acid groups, ester groups, amide groups and amine groups.

The term "heteroaromatic group" means an aromatic group wherein at least one of the cyclic conjugated carbon atoms is replaced by a nitrogen atom, a sulphur atom, an oxygen atom or a phosphorous atom.

The term "heterocyclic group" means an alicyclic hydrocarbon group wherein at least one of the cyclic carbon atoms is replaced by an oxygen atom, a nitrogen atom, a phosphorous atom, a silicon atom, a sulfur atom, a selenium atom or a tellurium atom.

Method for Preparing a Tamperproof ID Document

Aspects of the present invention have been realized by a method for preparing a tamperproof ID document comprising in order the steps of a) providing an ID document having at least one image on at least one outermost surface of said ID document; b) printing or coating a curable liquid on at least one of said outermost surfaces of said ID document thereby forming an outermost layer on said printed or coated outermost surface at least partially covering said at least one image; and c) curing said outermost layer; wherein said curable liquid comprises a polymerizable and/or a polymeric abherent agent and said printed or coated outermost surface is the surface of a layer or foil exclusive of porous pigment.

According to a first embodiment of the method, according to the present invention, the curable liquid is jetted according to a second image, thereby enhancing the problems for falsification. The second image may comprise some form of a "security pattern", such as small dots, thin lines, holograms, microprint and Moire inducing patterns which may be produced using fluorescent inks, phosphorescent inks, pearlescent inks or other optically variable inks, such as metameric inks.

According to a second embodiment of the method, according to the present invention, the ID document comprises any type of support having an image or part of an image thereon. The image may be produced by any known imaging or printing technique.

According to a third embodiment of the method, according to the present invention, the ID document comprises a support without any additional ink-receiving layers thereon and an image or part of an image applied on the support by a technique, such as for example laser engraving or radiation curable ink-jet printing.

According to a fourth embodiment of the method, according to the present invention, the ID document is a support to which has been applied different layers coated by any conventional coating technique, such as dip coating, knife coating, extrusion coating, spin coating, slide hopper coating and curtain coating.

According to a fifth embodiment of the method, according to the present invention, the ID document is a support to which has been applied one or more ink-receiving layers. The ink-receiving layer preferably comprises at least a polymeric binder. The ink-receiving layer may further comprise well-known conventional ingredients, such as fillers, colorants, surfactants serving as coating aids, cross-linking agents, plasticizers, cationic substances acting as mordant, light-stabilizers, pH adjusters, anti-static agents, biocides, lubricants, whitening agents, cross-linking agents and matting agents.

If the ink-receiving layer comprises a large amount of filler, i.e. so called porous ink-jet ink-receiving layers, generally first a layer of a curable liquid is applied and cured before applying the curable liquid comprising the abherent agent. On the other hand if a small amount or no fillers are used in the ink-receiving layer, i.e. so called polymer blend ink-receiving layers, the curable liquid comprising the abherent agent can be applied directly on the ink-receiving layer.

The dry thickness of the ink-receiving layer or the ink-receiving layers is preferably at least 5 μm, more preferably at least 10 μm and most preferably at least 15 μm.

The image or parts of the image can be provided by any suitable imaging method or combination of imaging methods. Invariant data may be applied by any impact printing technique, such as offset printing, flexographic printing, gravure, screen-printing and ink-jet printing. For variable data a non-impact printing technique is preferably used, ink-jet printing is the preferred choice since additional security features can be included in the ink-jet inks.

According to a sixth embodiment of the method, according to the present invention, an outermost layer comprising an abherent agent is present on both the front side and the backside of the ID document. This is especially useful when the image is viewed through a transparent support or when the backside of a non-transparent ID card carries a signature.

ID Documents

Aspects of the present invention have also been realized by an ID document wherein the surface of an outermost layer at least partially covering an image on said ID document has a surface energy of less than 28 mJ/m$^2$.

According to a first embodiment of the ID document, according to the present invention, the ID document secured against alteration is obtainable by a method for preparing a tamperproof ID document comprising in order the steps of a) providing an ID document having at least one image on at least one outermost surface of said ID document; b) printing or coating a curable liquid on at least one of said outermost surfaces of said ID document thereby forming an outermost layer on said printed or coated outermost surface at least partially covering said at least one image; and c) curing said outermost layer; wherein printed or coated outermost surface is the surface of a layer or foil exclusive of porous pigment and said curable liquid comprises a polymerizable and/or a polymeric abherent agent, preferably a silicone-modified or a fluorinated polymerizable compound as abherent agent.

The ID document can be transparent, translucent or opaque.

Supports

According to a seventh embodiment of the method, according to the present invention, the ID document comprises a support chosen from paper type and polymeric type supports.

Paper type supports include plain paper, cast coated paper; resin coated paper e.g. polyethylene coated paper and polypropylene coated paper (single or double sided).

Polymeric type supports include cellulose acetate propionate or cellulose acetate butyrate, polyesters such as polyethylene terephthalate and polyethylene naphthalate, polyvinylchloride, polyamides, polycarbonates, polyimides, polyolefins, poly(vinylacetals), polyethers and polysulfonamides. Other examples of useful high-quality polymeric supports for the present invention include opaque white polyesters and extrusion blends of polyethylene terephthalate and polypropylene. Polyester film supports and especially poly (ethylene terephthalate) and glycol modified poly(ethylene terephthalate) (=PET-G) are preferred. When such a polyester is used as the support material, a subbing layer may be employed to improve the bonding of the ink-receiving layer to the support. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

According to an eighth embodiment of the method, according to the present invention, the ID document comprises a support chosen from paper type and polymeric type supports are treated with a corona or plasma. Corona or plasma treatment can assist bonding further layers e.g. to the cured curable liquid and ink-receiving layers.

According to a ninth embodiment of the method, according to the present invention, the ID document comprises a polyolefin or polyolefin-coated support e.g. polyolefin-coated paper or carton. Polyolefin and polyolefin-coated supports are preferred supports for thermal lamination.

According to a tenth embodiment of the method, according to the present invention, the ID document comprises a support made from an inorganic material e.g. a metal oxide or a metal (e.g. aluminium and steel). The ID document can also be an ID label used on a product with a support such as cardboard, wood, composite boards, plastic, coated plastic, canvas, textile, glasses, plant fibre products, leather, and ceramics.

According to an eleventh embodiment of the method, according to the present invention, the ID document comprises a support not exclusively consisting of paper.

According to a twelfth embodiment of the method, according to the present invention, the ID document comprises a transparent support.

According to a thirteenth embodiment of the method, according to the present invention, the ID document comprises a translucent or opaque support.

According to a fourteenth embodiment of the method, according to the present invention, the ID document comprises a support consiting of a multi-layer stacking of different materials.

Abherent Agents

The abherent agent used in the curable liquid of the method for preparing a tamperproof ID document according to the present invention causes the outermost layer to have a difficult-to-wet surface. This surface preferably has a surface energy of less than 28 mJ/m$^2$.

The abherent agent must be present in the cured outermost layer in a polymeric form otherwise it can be easily removed by wiping and using a strong organic solvent such as toluene or a chlorinated solvent. Low molecular weight fluoro-surfactants are not suitable abherent agents in the present invention.

A single abherent agent or a mixture of abherent agents may be used as long as the abhesive properties of the outermost layer are obtained.

The abherent agent can be added to the curable liquid as a polymerizable compound or as a polymeric abherent agent or a combination of both. Preferably the abherent agent is a silicone-modified or a fluorinated polymerizable compound. The abherent agent is preferably exclusive of epoxysilanes modified with oxyalkylene ether groups.

Abherent agents suitable as polymerizable compound constitute preferably from 20 to 99.6%, more preferably 24 to 90%, and most preferably 30 to 80% by weight of the total composition of the curable liquid.

Abherent agents suitable as a polymerizable compound include silicone-modified (meth)acrylates, fluorinated (meth)acrylates, fluorinated ethylenes and epoxy-functional silane compounds.

Preferred silicone-modified acrylates include Ebecryl™ 350 (silicon diacrylate) and Ebecryl™ 1360 (silicon hexaacrylate) from UCB, Belgium; Actilane™ 800 (silicon acrylate) from AKZO-NOBEL NV; and CN990™ (siliconized urethane acrylate oligomer) from SARTOMER. Illustrative examples of suitable epoxy-silanes include γ-glycidoxypropyl trimethoxysilane, γ-glycidoxypropyl triethoxysilane, β-glycidoxyethyl trimethoxysilane, γ-(3,4-epoxycyclohexyl)propyl trimethoxysilane, β-(3,4-epoxycyclohexyl) ethyl trimethoxysilane, and the like. The most preferred epoxy-silane compound is γ-glycidoxypropyl trimethoxysilane.

Examples of suitable epoxy-silanes include (metha)acryloxyalkylalkoxysilanes such as γ-(meth)acryloxypropyltrimethoxysilane, γ-(meth)acryloxypropyltriethoxysilane and γ-(meth)acryloxypropyltriisopropoxysilane; (meth)acryloxyalkylalkoxyalkylsilanes such as γ-(meth)acryloxypropylmethyldimethoxysilane and γ-(meth)acryloxypropylmethyldiethoxysilane; vinyltrimethoxysilane, vinyltriethoxysilane, vinyltriisopropoxysilane, aryltriethoxysilane, vinylmethyldimethoxysilane, vinylmethyldiethoxysilane and vinyltris(2-methoxyethoxy)silane.

Examples of fluorinated polymerizable compounds include 2,2,2-trifluoroethyl-α-fluoroacrylate (TFEFA), 2,2,2-trifluoroethylmethacrylate (TFEMA), 2,2,3,3-tetrafluoropropyl-α-fluoroacrylate (TFPFA), 2,2,3,3-tetrafluoropropylmethacrylate (TFPMA), 2,2,3,3,3-pentafluoropropyl-α-fluoroacrylate (PFPFA), 2,2,3,3,3-pentafluoropropylmethacrylate (PFPMA), 1H,1H-perfluoro-n-octyl acrylate, 1H,1H-perfluoro-n-decyl acrylate,1H,1H-perfluoro-n-octyl methacrylate, 1H,1H-perfluoro-n-decyl methacrylate, 1H,1H,6H,6H-perfluoro-1,6-hexanediol diacrylate, 1H,1H,6H,6H-perfluoro-1,6-hexanediol dimethacrylate, 2-(N-butylperfluorooctanesulfonamido)ethyl acrylate, 2-(N-ethyl perfluorooctanesulfonamido) ethyl acrylate, 2-(N-ethyl perfluorooctanesulfonamido) ethyl methacrylate, $C_8F_{17}CH_2CH_2OCH_2CH_2$—OOC—CH=CH$_2$ and $C_8F_{17}CH_2CH_2OCH_2CH_2$—OOC—C(CH$_3$)=CH$_2$.

The abherent agent present in the cured outermost layer may be selected from the group consisting of polymers of dimethylsiloxane; copolymers of dimethylsiloxane; dimethyl siloxane-modified polyethers; dimethyl siloxane modified polyesters; silicone glycol copolymers; polymers of fluorinated ethylene such as polytetrafluoroethylene, polyvinylfluoride and polyvinylidene fluoride (PVDF); copolymers of fluorinated ethylene such as a fluorinated ethylene/propylene copolymers and ethylene/tetrafluoroethylene copolymers; polymers of fluorinated (meth)acrylates; copolymers of fluorinated (meth)acrylates; and perfluoro(alkyl vinyl ether)s.

Curable Liquids

According to a fifteenth embodiment of the method for preparing a tamperproof ID document, according to the present invention, the curable liquid comprises at least one polymerizable compound and/or a polymer.

According to a sixteenth embodiment of the method for preparing a tamperproof ID document, according to the present invention, the curable liquid comprises at least one curable compound.

According to a seventeenth embodiment of the method for preparing a tamperproof ID document, according to the present invention, the curable liquid has a surface tension of less than 28 mN/m, with less than 25 mN/m being preferred.

According to an eighteenth embodiment of the method for preparing a tamperproof ID document, according to the present invention, the curable liquid is exclusive of oxetane compounds and polymers comprising oxetane groups.

According to a nineteenth embodiment of the method for preparing a tamperproof ID document, according to the present invention, the curable liquid further comprises at least one solvent.

According to a twentieth embodiment of the method for preparing a tamperproof ID document, according to the present invention, the curable liquid is a curable ink-jet ink for jetting the outermost part of an image or another image on the ID document. The curable ink-jet ink may belong to a curable colour ink-jet ink set for jetting an image on the ID document used in the method for preparing a tamperproof ID document according to the present invention. Preferred curable colour ink-jet ink sets comprise cyan, magenta and yellow curable ink-jet inks. A black curable ink-jet ink or other colour curable ink-jet inks (red, green, blue, . . . ) may be added. The curable colour ink-jet ink set can also be a multi-density ink-jet ink set comprising at least one combination of curable ink-jet inks with about the same hue but different chroma and lightness.

The curable ink-jet ink for jetting the outermost part of an image or another image on the ID document comprises a colorant and an abherent agent or a mixture of abherent agents, wherein the abherent agent or the mixture of abherent agents is present in an amount between 20 and 99.6 wt % based on the total weight of the curable ink-jet ink.

Monomers and Oligomers

According to a twenty-first embodiment of the method for preparing a tamperproof ID document, according to the present invention, the curable liquid comprises at least one curable compound including any monomer or oligomer.

According to a twenty-second embodiment of the method for preparing a tamperproof ID document, according to the present invention, the curable liquid further comprises a combination of monomers, oligomers and/or prepolymers. The monomers, oligomers and/or prepolymers may possess different degrees of functionality, and a mixture including combinations of mono-, di-, tri- and higher functionality monomers, oligomers and/or prepolymers may be used.

The curable compound(s) used in the curable liquid for the method for preparing a tamperproof ID document according to the present invention can be any monomer and/or oligomer found in Polymer Handbook, Vol. 1 & 2, 4th edition. Edited by J. BRANDRUP, et al. Wiley-Interscience, 1999.

Suitable examples of monomers include: acrylic acid, meth-acrylic acid, maleic acid (or their salts), maleic anhydride; alkyl-(meth)acrylates (linear, branched and cycloalkyl) such as methyl-(meth)acrylate, n-butyl(meth)acrylate, tert-butyl(meth)acrylate, cyclohexyl(meth)acrylate and 2-ethylhexyl(meth)acrylate; aryl(meth)-acrylates such as benzyl(meth)acrylate and phenyl(meth)-acrylate; hydroxyalkyl(meth)acrylates such as hydroxyethyl(meth)-acrylate and hydroxypropyl(meth)acrylate; (meth)acrylates with other types of functionalities (e.g. oxirane, amino, polyethylene oxide, phosphate-substituted) such as glycidyl(meth)acrylate, dimethylaminoethyl-(meth)acrylate, methoxypolyethyleneglycol (meth)acrylate and tri-propyleneglycol(meth)acrylate phosphate; allyl derivatives such as allyl glycidyl ether; styrenics such as styrene, 4-methyl-styrene, 4-hydroxystyrene, and 4-acetoxystyrene; (meth)acrylonitrile; (meth)-acrylamides (including N-mono and N,N-disubstituted) such as N-benzyl(meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether; and vinylesters of carboxylic acids such as vinylacetate and vinylbutyrate.

Preferred monomers and oligomers are selected from 1,6-hexane-diol acrylate, alkoxylated aliphatic diacrylates, alkoxylated hexanediol diacrylate, alkoxylated neopentyl glycol diacrylate, di-ethylene glycol diacrylate, dipropyleneglycol diacrylate, ethoxy-lated(10) bisphenol A diacrylate, neopentyl glycol diacrylate, tri-ethylene glycol diacrylate, tripropylene glycol diacrylate, 2(2-ethoxyethoxy)ethyl acrylate, isobornyl methacrylate, isobornyl acrylate, isodecyl acrylate, lauryl acrylate, tetrahydrofurfuryl acrylate, tridecyl acrylate, tridecyl methacrylate, ditrimethylol-propane tetraacrylate, dipentaerythritol tetraacrylate, pentaeryth-ritol tetraacrylate, ethoxylated(15)trimethylolpropane triacrylate, dipentaerythritol triacrylate, trimethylol-propane triacrylate, trimethylolpropane trimethacrylate, aliphatic urethane acrylates, amine modified polyether acrylate oligomers, aromatic urethane acrylates, epoxy acrylates and polyester acrylate oligomers.

Colorants

According to a twenty-third embodiment of the method for preparing a tamperproof ID document, according to the present invention, the curable liquid further comprises at least one colorant.

Colorants used in the curable liquid may be dyes, pigments or a combination thereof. Organic and/or inorganic pigments may be used. The colorant used in the curable liquid may be white, black, cyan, magenta, yellow, red, orange, violet, blue, green, brown, mixtures thereof, and the like.

According to a twenty-fourth embodiment of the method for preparing a tamperproof ID document, according to the present invention, the curable liquid further comprises at least one white pigment such as titanium oxide.

The pigment may be chosen from those disclosed by HERBST, W, et al. Industrial Organic Pigments, Production, Properties, Applications. 2nd edition. VCH, 1997.

Suitable yellow pigments include C.I. Pigment Yellow 1, 3, 10, 12, 13, 14, 17, 55, 65, 73, 74, 75, 83, 93, 109, 120, 128, 138, 139, 150, 151, 154, 155, 180 and 185.

Suitable red pigments include C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 221, 248, 251 and 264.

Suitable violet pigments include C.I. Pigment Violet 1, 2, 19, 23, 32, 37 and 39.

Suitable blue pigments include C.I. Pigment Blue 15:1, 15:2, 15:3, 15:4, 16, 56, 61 and (bridged) aluminum phthalocyanine pigments.

Suitable orange pigments include C.I. Pigment Orange 5, 13, 16, 34, 67, 71 and 73.

Suitable green pigments include C.I. Pigment Green 7 and 36.

Suitable brown pigments include C.I. Pigment Brown 6 and 7.

Suitable white pigments include C.I. Pigment White 6.

Suitable metallic pigments include C.I. Pigment Metal 1, 2 and 3.

For a curable black ink-jet ink, suitable black pigments include carbon blacks such as Regal™ 400R, Mogul™ L, Elftex™ 320 from Cabot Co.; Carbon Black FW18, Special Black™ 250, Special Black™ 350, Special Black™ 550, Printex™ 25, Printex™ 35, Printex™ 55, Printex™ 150T from DEGUSSA Co.; C.I. Pigment Black 7 and C.I. Pigment Black 11.

The pigment particles in the curable liquids should be sufficiently small to permit free flow of the ink through the ink-jet printing device, especially at the ejecting nozzles. It is also desirable to use small particles for maximum colour strength.

The particle size should enable the objectives of the present invention to be achieved. The average particle size of the pigment in the pigmented ink-jet ink is preferably between 0.005 µm and 15 µm, with between 0.005 and 5 µm being particularly preferred, between 0.005 and 1 µm being especially preferred, between 0.005 and 0.3 µm being more especially preferred and between 0.040 and 0.150 µm being most especially preferred.

Dyes suitable for the curable liquids include direct dyes, acidic dyes, basic dyes and reactive dyes. Direct dyes suitable for use in the ink-jet ink used in the method for preparing a tamperproof ID document according to the present invention include:

C.I. Direct Yellow 1, 4, 8, 11, 12, 24, 26, 27, 28, 33, 39, 44, 50, 58, 85, 86, 100, 110, 120, 132, 142, and 144

C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343

C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237

C.I. Direct Black 2, 3, 7, 17, 19, 22, 32, 38, 51, 56, 62, 71, 74, 75, 77, 105, 108, 112, 117, 154 and 195

Acidic dyes suitable for use in the ink-jet ink used in the method for preparing a tamperproof ID document according to the present invention include:

C.I. Acid Yellow 2, 3, 7, 17, 19, 23, 25, 20, 38, 42, 49, 59, 61, 72, and 99

C.I. Acid Orange 56 and 64

C.I. Acid Red 1, 8, 14, 18, 26, 32, 37, 42, 52, 57, 72, 74, 80, 87, 115, 119, 131, 133, 134, 143, 154, 186, 249, 254, and 256

C.I. Acid Violet 11, 34, and 75

C.I. Acid Blue 1, 7, 9, 29, 87, 126, 138, 171, 175, 183, 234, 236, and 249

C.I. Acid Green 9, 12, 19, 27, and 41

C.I. Acid Black 1, 2, 7, 24, 26, 48, 52, 58, 60, 94, 107, 109, 110, 119, 131, and 155.

Reactive dyes suitable for use in the ink-jet ink used in the method for preparing a tamperproof ID document according to the present invention include:

C.I. Reactive Yellow 1, 2, 3, 14, 15, 17, 37, 42, 76, 95, 168, and 175

C.I. Reactive Red 2, 6, 11, 21, 22, 23, 24, 33, 45, 111, 112, 114, 180, 218, 226, 228, and 235

C.I. Reactive Blue 7, 14, 15, 18, 19, 21, 25, 38, 49, 72, 77, 176, 203, 220, 230, and 235

C.I. Reactive Orange 5, 12, 13, 35, and 95

C.I. Reactive Brown 7, 11, 33, 37, and 46

C.I. Reactive Green 8 and 19

C.I. Reactive Violet 2, 4, 6, 8, 21, 22, and 25

C.I. Reactive Black 5, 8, 31, and 39

Basic dyes suitable for use in the ink-jet ink used in the method for preparing a tamperproof ID document according to the present invention include:

C.I. Basic Yellow 11, 14, 21, and 32

C.I. Basic Red 1, 2, 9, 12, and 13

C.I. Basic Violet 3, 7, and 14

C.I. Basic Blue 3, 9, 24, and 25

Dyes can only manifest the ideal colour in an appropriate range of pH value. Therefore, the ink-jet ink used in the method for preparing a tamperproof ID document according to the present invention preferably further comprises a pH adjuster.

According to a twenty-fifth embodiment of the method for preparing a tamperproof ID document, according to the present invention, the curable liquid further comprises at least one colorant in a concentration of 0.1 to 20 wt % based on the total weight of the curable liquid, with 1 to 10 wt % being preferred.

Fluorescent or Phosphorescent Compounds

According to a twenty-sixth embodiment of the method for preparing a tamperproof ID document, according to the present invention, the curable liquid further comprises at least one fluorescent compound or at least one phosphorescent compound e.g. to introduce additional security features. Examples of suitable UV-fluorescent and phosphorescent compounds include Tinopal™ grades such as Tinopal™ SFD, Uvitex™ grades such as Uvitex™ NFW and UVITEX™ OB from CIBA-GEIGY SPECIALTY CHEMICALS; LUMILUX™ luminescent pigments from HONEYWELL; KEYFLUOR™ dyes and pigments from KEYSTONE; Leukophor™ grades from CLARIANT; Blancophor™ grades such as Blancophor™ REU and Blancophor™ BSU from BAYER; and fluorescent dyes from SYNTHEGEN.

According to a twenty-seventh embodiment of the method for preparing a tamperproof ID document, according to the present invention, the curable liquid further comprises at least one fluorescent compound in a concentration of 0.1 to 20 wt % based on the total weight of the curable liquid, with 1 to 10 wt % being preferred.

Polymeric Dispersants

According to a twenty-eighth embodiment of the method for preparing a tamperproof ID document, according to the present invention, the curable liquid further comprises at least one polymeric dispersant e.g. to obtain a stable dispersion of a pigment in the ink-jet ink.

Polymeric dispersants usable in this invention are not specifically restricted, but the following resins are preferred: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

Typically polymeric dispersants are incorporated at 2.5% to 200%, more preferably at 50% to 150% by weight of the pigment.

Non-polymeric Dispersants

According to a twenty-ninth embodiment of the method for preparing a tamperproof ID document, according to the present invention, the curable liquid further comprises s non-polymeric dispersant. A detailed list of non-polymeric as well as some polymeric dispersants is disclosed by MC CUTCHEON. Functional Materials, North American Edition. Glen Rock, N.J.: Manufacturing Confectioner Publishing Co., 1990. p.110-129.

Typically non-polymeric dispersants are incorporated at 2.5% to 200%, more preferably at 50% to 150% by weight of the pigment.

Initiators

According to a thirtieth embodiment of the method for preparing a tamperproof ID document, according to the present invention, the curable liquid further comprises at least one initiator.

The initiator typically initiates the polymerization reaction. The initiator can be a thermal initiator, but is preferably a photo-initiator. The photo-initiator requires less energy to activate than the monomers, oligomers and/or prepolymers to form the polymer. The photo-initiator suitable for use in the curable liquids may be a Norrish type I initiator, a Norrish type II initiator or a photo-acid generator.

Thermal initiator(s) suitable for use in the curable liquid include tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane,1,1-bis(tert-butylperoxy)cyclohexane, 2,5-bis(tert-butylperoxy)-2,5-dimethylhexane, 2,5-Bis(tert-butyl-peroxy)-2,5-dimethyl-3-hexyne, bis(1-(tert-butylperoxy)-1-methyl-ethyl)benzene, 1,1-bis(tert-butylperoxy)-3,3,5-trimethyl-cyclo-hexane, tert-butyl hydroperoxide, tert-butyl peracetate, tert-butyl peroxide, tert-Butyl peroxybenzoate, tert-Butylperoxy isopropyl carbonate, cumene hydroperoxide, cyclohexanone peroxide, dicumyl peroxide, Lauroyl peroxide, 2,4-pentanedione peroxide, peracetic acid and potassium persulfate.

The photo-initiator or photo-initiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photo-initiator together.

A combination of different types of initiator, for example, a photo-initiator and a thermal initiator can also be used. A preferred Norrish type I-initiator is selected from the group consisting of benzoinethers, benzil ketals, α,α-dialkoxyaceto-phenones, α-hydroxyalkylphenones, α-aminoalkylphenones, acylphosphine oxides, acylphosphine sulphides, α-haloketones, α-halosulfones and α-halophenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed in CRIVELLO, J. V., et al. VOLUME III: Photoinitiators for Free Radical Cationic & Anionic Photopolymerization. 2ndth edition. Edited by BRADLEY, G. London, UK: John Wiley and Sons Ltd, 1998. p.287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluorophosphate.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocurm™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

According to a thirty-first embodiment of the method for preparing a tamperproof ID document, according to the present invention, the curable liquid further comprises an initiator system.

According to a thirty-second embodiment of the method for preparing a tamperproof ID document, according to the present invention, the curable liquid further comprises a photo-initiator system comprising photo-initiator(s) and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable liquid.

According to a thirty-third embodiment of the method for preparing a tamperproof ID document, according to the present invention, the curable liquid further comprises at least one co-initiator. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable liquid. A preferred initiator is 2,2'-bis(o-chlorophenyl)-4,4',5,5'-tetraphenyl-(7CI, 8CI) 4,4'-Bi-4H-imidazole corresponding to the chemical formula:

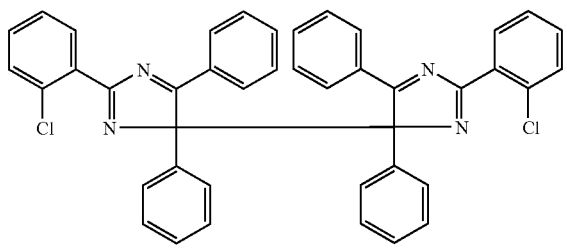

in the presence of a co-initiator such as 2-mercapto benzoxazole. Another preferred type of initiator is an oxime ester. A suitable example has as chemical formula:

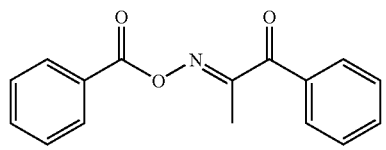

A preferred amount of initiator is 0.3-50 wt % of the total weight of the curable liquid, and more preferably 1 to 15 wt % of the total weight of the curable liquid.

Irradiation with actinic radiation may be realized in two steps by changing wavelength or intensity. In such cases it is preferred to use 2 types of photo-initiator together.

Inhibitors

According to a thirty-fourth embodiment of the method for preparing a tamperproof ID document, according to the present invention, the curable liquid further comprises a polymerization inhibitor e.g. to restrain thermal polymerization or polymerization by actinic radiation during storage.

Suitable polymerization inhibitors include phenol type antioxidants, hindered amine light stabilizers, phosphor type antioxidants, hydroquinone monomethyl ether commonly used in (meth)-acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd, Ciba Irgastab™ UV10 from CIBA Specialty Products and Genorad™ 16 available from RAHN.

Since excessive addition of these polymerization inhibitors will lower the sensitivity to curing, it is preferred that the amount capable of preventing polymerization be determined prior to blending. The amount of a polymerization inhibitor is generally between 200 and 20,000 ppm of the total weight of the curable liquid.

Surfactants

According to a thirty-fifth embodiment of the method for preparing a tamperproof ID document, according to the present invention, the further comprises at least one surfactant.

The surfactant(s) can be anionic, cationic, non-ionic, or zwitter-ionic and are usually added in a total quantity below 20 wt % based on the total curable liquid weight and particularly in a total below 10 wt % based on the total weight of the curable liquid.

Dispersion Medium

The curable liquid may comprise monomers and/or oligomers as the dispersion medium and may further comprise water and/or organic solvents, such as alcohols, fluorinated solvents and dipolar aprotic solvents.

However, the curable liquids preferably do not comprise an evaporable component, but sometimes, it can be advantageous to incorporate an extremely small amount of an organic solvent in such inks to improve adhesion to the surface of the ink-receiver after UV curing. In this case, the added solvent can be any amount in the range that does not cause problems of solvent resistance and VOC, and preferably 0.1-5.0 wt %, and particularly preferably 0.1-3.0 wt %, each based on the total weight of the curable liquid.

Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Biocides

According to a thirty-sixth embodiment of the method for preparing a tamperproof ID document, according to the present invention, the curable liquid further comprises at least one biocide.

Suitable biocides for the curable liquid used in the method for preparing a tamperproof ID document according to the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for the curable liquid is Proxe™ GXL available from ZENECA COLOURS.

A biocide is preferably added in an amount of 0.001 to 3 wt. %, more preferably 0.01 to 1.00 wt. %, each based on the curable liquid.

Other Additives

According to a thirty-seventh embodiment of the method for preparing a tamperproof ID document, according to the present invention, the curable liquid further comprises at least one of each of the following additives: evaporation accelerators; rust inhibitors; crosslinking agents; soluble electrolytes as conductivity aids; sequestering agents and chelating agents; a thermochromic compound, an iridescent compound and a magnetic particle compound. These additives may enhance the desired performance and may provide additional security features.

Printing Means

According to a thirty-eighth embodiment of the method for preparing a tamperproof ID document, according to the present invention, the curable liquid is printed by a conventional printing process including but not restricted to ink-jet printing, intaglio printing, screen printing, flexographic printing, offset printing, stamp printing and gravure printing. In the case of ink-jet printing the curable liquid is jetted by one or more printing heads ejecting small droplets of liquid in a controlled manner through nozzles onto an ink-receiver surface, which is moving relative to the printing head(s).

A preferred printing head for the ink-jet printing system according to the present invention is a piezoelectric head. Piezoelectric ink-jet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the method for preparing a tamperproof ID document according to the present invention is not restricted to piezoelectric ink-jet printing. Other ink-jet printing heads can be used and include various types, such as a continuous type and thermal, electrostatic and acoustic drop on demand type.

At high printing speeds, the liquid must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogenous liquid capable of rapid conversion to a dry printed area.

The viscosity of the curable liquid used in the ink-jet printing method according to the present invention is preferably lower than 30 mPa·s, more preferably lower than 15 mPa·s, and most preferably between 2 and 10 mPas at a shear rate of 100 $s^1$ and a jetting temperature between 10 and 55° C.

The ink-jet printing head normally scans back and forth in a transversal direction across the moving ink-receiver surface. Often the ink-jet print head does not print on the way back. Bi-directional printing is preferred for obtaining a high areal throughput. Particularly preferred, is printing in a "single pass printing process", which can be performed by using page wide ink-jet printing heads or multiple staggered ink-jet printing heads which cover the entire width of the ink-receiver surface. In a single pass printing process the ink-jet printing heads usually remain stationary and the ink-receiver surface is transported under the ink-jet printing heads.

Curing Means

According to a thirty-ninth embodiment of the method for preparing a tamperproof ID document, according to the present invention, the curable liquid is cured by exposure to actinic radiation, by thermal curing and/or by electron beam curing. A preferred means of radiation curing is ultraviolet radiation. Preferably the curing is performed by an overall exposure to actinic radiation, by overall thermal curing and/or by overall electron beam curing.

The curing means may be arranged in combination with the print head of the ink-jet printer, travelling therewith so that the curable liquid is exposed to curing radiation very shortly after being jetted.

In such an arrangement it can be difficult to provide a small enough radiation source connected to and travelling with the print head. Therefore, a static fixed radiation source may be employed, e.g. a source of curing UV radiation, connected to the radiation source by means of flexible radiation conductive means such as a fibre optic bundle or an internally reflective flexible tube. Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source may be employed as a radiation source, such as, a high or low pressure mercury lamp, a cold cathode tube, a black light, an ultraviolet LED, an ultraviolet laser, and a flash light, if part of the emitted light can be absorbed by the photo-initiator or photo-initiator system. The preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

According to a fortieth embodiment of the method for preparing a tamperproof ID document, according to the present invention, the printed or coated curable liquid is cured consecutively or simultaneously using two light sources of different wavelengths or illuminance. For example, the first UV source can be selected to be rich in UV-C, in particular in the range of 260 nm-200 nm. The second UV source can then be rich in UV-A, e.g. a gallium-doped lamp, or a different lamp high in both UV-A and UV-B. The use of two UV sources has been found to be advantageous e.g. a fast curing speed.

For facilitating curing, the ink-jet printer often includes one or more oxygen depletion units. The oxygen depletion units place a blanket of nitrogen or other relatively inert gas (e.g.$CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Thermal curing can be performed image-wise by use of a thermal head, a heat stylus, hot stamping, a laser beam, etc. If a laser beam is used, then preferably an infrared laser is used in combination with an infrared absorbing substance in the curable liquid.

EXAMPLES

All materials used in the following examples were readily available from Aldrich Chemical Co. (Belgium) unless otherwise specified. The "water" used in the example was deionized water. The following materials were used:

SR506D™ is an isobornyl acrylate from SARTOMER.
Actilane™ 411 is a cyclic trimethylolpropane formal acrylate from AKZO-NOBEL.
Ebecryl™ 11 is a polyethylene glycol diacrylate from UCB.
Ebecryl™ 1039 is an anorganic urethane monoacrylate from UCB.
Irgacure™ 500 is a photo-initiator from CIBA SPECIALTY CHEMICALS.
Perenol™ S Konz. is a surfactant from COGNIS.
Mersolat™ H is a mixture of secondary alkane sulfonates from BAYER.
VINNAPAS™ EP1 is a 50% dispersion in water of copoly (ethylene-vinylacetate) latex from AIR PRODUCTS & CHEM. Broxan is a 5 wt % aqueous solution (40/60 water/ethanol) of the biocide 5-Bromo-5-Nitro-1,3-Dioxane from HENKEL.
Kieselsol™ 100F is a 30% dispersion of $SiO_2$ in water from BAYER.
SIPERNAT™ 570 is a silica from DEGUSSA Co.
CAT-FLOC™ T2 is poly(diallyldimethylammonium chloride from CALGON EUROPE N.V.
POVAL™ R-3109 is a silanol modified polyvinyl alcohol from KURARAY Co.
AGFA PET is a 100 μm PET film from AGFA-GEVAERT NV, coated with a subbing layer, manufactured by applying a solution, consisting of 246 mL of a 32% latex based on a copolymer of 88 wt % vinylidene chloride, 10 wt % methylacrylate and 2 wt % itaconic acid, 48 mL of Kieselsol™ 100F-30 and 10 mL of a 4.85 wt % solution in water of Mersolat™ H, and 696 mL of demineralized water, by air knife coating to a uniaxially oriented PET (130 $m^2$/L), drying at 150° C. air temperature and stretching in a transversal direction (factor 3.6). ADPB is AGFAJET DIGITAL PROOFING BASE GLOSSY from AGFA-GEVAERT NV.
Stabilo™ OHPen Universal Permanent Pen Blue is a blue marker with a point of 0.4 mm from SCHLEIPER Office supplies, Belgium.
Guilbert™ Guilmarker 90 is marker from OFFICE DEPOT, France.
Corporate Express™ Chisel Tip Highlighter (Code 208 09 68) is a yellow fluorescent highlighter from CORPORATE EXPRESS.
Pentel™ Maxiflo White Board Marker (MWL5M) is a marker from EURO PENTEL S.A., France.
Monti label art.167155 is a "Laser, ink-jet and copier A4-label" art.167155 from MONTI NV, Belgium.

Measurement Methods:

1. Adhesion:

The adhesion of a layer to the other layer or to the support was tested by pressing a 5 cm piece of Scotch Magic™ Tape 810 from 3M onto the sample and pulling it off with moderate force. The test result was evaluated as:

| | | |
|---|---|---|
| OK | = | if no parts of the sample came off with the tape |
| Not OK | = | if parts of the sample came off with the tape |

A good adhesion of all layers on the support is required

2. Writing & Erasability Test:

This test checks if a sample can be falsified using a number of different pens for writing on the sample. The pens used are:

Pen 1: Guilbert™ Guilmarker 90
Pen 2: Corporate Express™ Chisel Tip Highlighter
Pen 3: Pentel™ Maxiflo White Board Marker
Pen 4: Stabilo™ OHPen Universal Permanent F Blue.

An evaluation was made according to the criteria given below.

| Criterion | | |
|---|---|---|
| 1 | = | immediate and very strong repelling of the ink is observed on writing and the written information can be very easily wiped away |
| 2 | = | almost immediate and strong repelling of the ink is observed on writing and the written information can be easily wiped away |
| 3 | = | almost immediate and strong repelling of the ink is observed on writing and the written information can be wiped away but not so easily as in criterion 2 |
| 4 | = | weak repelling of the ink is observed on writing but the written information can be wiped away |
| 5 | = | weak repelling of the ink is observed on writing and the written information is difficult to wipe away |
| 6 | = | no or almost no repelling of the ink is observed on writing and the written information can hardly or not be wiped away |

It is considered that falsification of an ID card is possible with a criterion evaluated to be 4, 5 or 6, while if the criterion is evaluated to be 1, 2 or 3 falsification is prevented.

3. Printing Test:

An Agorix® UV curable magenta ink-jet ink from AGFA was jetted according to an image comprising a logo and text by a custom built ink-jet printer equipped with a UPHO print head from AGFA. A resolution of 360×360 dpi was used to print at 4 dpd (droplets per dot), each droplet having a droplet volume of 3 pL. An evaluation was made in accordance with the criterion described below.

| Criterion | | |
|---|---|---|
| − | = | no imaging possible on the sample |
| + | = | imaging on the sample |

To prevent falsification of an ID document, no imaging by an ink-jet printer should be possible. When no imaging was possible, i.e. a non-homogenous spreading of droplets and uncontrollable formation of large and small droplets), after curing the "falling apart" image could be easily removed from the ink-receiver.

4. Label Test

A Monti label art.167155 was applied to the sample. An evaluation was made in accordance with the criterion described below.

| Criterion | | |
|---|---|---|
| − | = | label can easily be peeled off |
| + | = | label sticks well to the sample and is difficult to remove |

Over-labelling of the personalised information, e.g. the photo of a person, in an ID document should not be possible. If a label does not adhere to an ID document due to its abhesive properties, it is immediately observed by the authority checking the ID document.

Example 1

This example illustrates that writing and over-labelling of ID cards can be prevented by using an abherent agent in the outermost layer of a curable liquid on an ink-receiver.

Three COMPARATIVE SAMPLES COMP-1 to COMP-3 and an INVENTION SAMPLE INV-1 were prepared according to Table 1.

TABLE 1

| Sample | Ink-receiver | Cured layer | Curable liquid with abherent agent |
|---|---|---|---|
| COMP-1 | Porous pigment-containing | No | No |
| COMP-2 | Porous pigment-containing | Yes | No |
| COMP-3 | Porous pigment-containing | No | Yes |
| INV-1 | Porous | Yes | Yes |
| INV-2 | Polymer blend | No | Yes |

Preparation of COMPARATIVE SAMPLE COMP-1:

First a dispersion A was prepared by mixing the ingredients according to Table 2.

TABLE 2

| Ingredient | Amount in g |
|---|---|
| SIPERNAT ™ 570 | 18.70 |
| POVAL ™ R-3109 | 2.70 |
| CAT-FLOC ™ T2 | 1.70 |
| Broxan | 0.03 |
| Citric acid | 0.03 |
| Water | 55.14 |

This dispersion A was then used to prepare an ink-receiver composition according to Table 3.

TABLE 3

| Ingredient | Amount in g |
|---|---|
| Dispersion A | 78.30 |
| VINAPAS ™ EP1 | 9.90 |
| CAT-FLOC ™ T2 | 0.40 |
| cetyltrimethylammonium bromide | 2.00 |
| water | 9.40 |

The thus prepared ink-receiver composition was coated onto the transparent subbed support AGFA PET at a coverage of 100 g/m$^2$ and dried in air.

After drying the ink receiving layer was printed by means of an EPSON PHOTO STYLUS™ R800 ink jet printer with multiple sets of digitally stored personal information to deliver COMPARATIVE SAMPLE COMP-1.

Preparation of the COMPARATIVE SAMPLE COMP-2

The COMPARATIVE SAMPLE COMP-1 was overcoated with a curable liquid LIQ-1 not comprising an abherent agent and having a composition according to Table 4.

TABLE 4

| Ingredient | Amount in g |
|---|---|
| SR506D ™ | 124.87 |
| Actilane ™ 411 | 74.33 |
| Ebecryl ™ 11 | 53.51 |
| Ebecryl ™ 1039 | 39.73 |
| Irgacure ™ 500 | 14.87 |
| Perenol ™ S Konz | 2.70 |

The curable liquid LIQ-1 was coated on COMPARATIVE SAMPLE COMP-1 using a BRAIVE barcoater with a 50 μm wired bar. The ink-receiver became totally transparent after penetration of the curable liquid into the ink-receiver. The coated layer was cured using a Fusion DRSE-120 conveyer, equipped with a Fusion VPS/I600 lamp (D-bulb 240 W/cm), which transported the samples under the UV lamp on a conveyer belt at a speed of 33.5 cm/s to deliver COMPARATIVE SAMPLE COMP-2. To obtain a complete curing two passes were necessary.

Preparation of the INVENTION SAMPLE INV-1

In the printed circuit industry, photographic masks bearing a circuit pattern are known as phototools. The company 3M has developed a coating solution, SCOTCHGARD™ Phototool Protector, to deal with scratching and abrasion, which is a serious problem for phototools. We have found that this solvent-free, low-viscosity solution comprises the polymerizable abherent agent γ-glycidoxypropyl trimethoxysilane and that it was possible to jet this solution. The solution had a viscosity at 25° C. of 11.4 mPa·s and a surface tension of 23.6 mN/m.

The SCOTCHGAR™ Phototool Protector solution was jetted on the COMPARATIVE SAMPLE COMP-2 with a custom built ink-jet printer equipped with an :UPH print head from AGFA. A resolution of 360×360 dpi was used to print at 8 dpd (droplets per dot), each droplet having a droplet volume of 3 pL.

The jetted sample was cured using a Fusion DRSE-120 conveyer, equipped with a Fusion VPS/I600 lamp (D-bulb 240 W/cm), which transported the samples under the UV lamp on a conveyer belt at a speed of 33.5 cm/s to deliver INVENTION SAMPLE INV-1.

Preparation of the COMPARATIVE SAMPLE COMP-3

The SCOTCHGARD™ Phototool Protector solution was also jetted on the COMPARATIVE SAMPLE COMP-1 with the custom built ink-jet printer equipped with an ™UPH print head from AGFA. A resolution of 360×360 dpi was used to print at 8 dpd.

The jetted sample was cured using a Fusion DRSE-120 conveyer, equipped with a Fusion VPS/I600 lamp (D-bulb 240 W/cm), which transported the samples under the UV lamp on a conveyer belt at a speed of 33.5 cm/s to deliver COMPARATIVE SAMPLE COMP-3.

Preparation of the Inventive Sample INV-2

A polymer blend type ink-receiver ADPB was printed by means of an EPSON PHOTO STYLUS™ R800 ink jet printer with multiple sets of digitally stored personal information The SCOTCHGARD™ Phototool Protector solution was then jetted on the polymer blend ink-receiver with the custom built ink-jet printer equipped with an :UPH print head from AGFA. A resolution of 360×360 dpi was used to print at 8 dpd. The jetted sample was cured using a Fusion DRSE-120 conveyer, equipped with a Fusion VPS/I600 lamp (D-bulb 240 W/cm), which transported the samples under the UV lamp on a conveyer belt at a speed of 33.5 cm/s to deliver the INVENTION SAMPLE INV-2.

Results and Evaluation

The COMPARATIVE SAMPLES COMP-1 to COMP-3 and the INVENTION SAMPLES INV-1 and INV-2 were tested for their adhesion and their falsification possibilities. The results are shown in Table 5.

TABLE 5

| Sample | Adhesion | Writing & erasability test | | | | Print test | Label test |
| --- | --- | --- | --- | --- | --- | --- | --- |
| | | Pen 1 | Pen 2 | Pen 3 | Pen 4 | | |
| COMP-1 | Not OK | 6 | 6 | 6 | 6 | + | + |
| COMP-2 | OK | 6 | 6 | 6 | 6 | + | + |
| COMP-3 | Not OK | 6 | 5 | 6 | 6 | + | (+) |
| INV-1 | OK | 1 | 1 | 1 | 1 | − | − |
| INV-2 | OK | 1 | 2 | 2 | 1 | − | − |

Table 5 shows that the porous pigment-containing ink-receiver required a cured layer of curable liquid before jetting the curable liquid comprising the abherent agent to obtain a tamperproof ID document. In comparative sample COMP-3 the cured layer of curable liquid was omitted and it was observed that the coated ink-receiver layer of COMP-1 not only became opaque but also did not longer adhere to the support on application of the curable liquid comprising the abherent agent. Hence it was difficult to evaluate over-labelling.

It can also be seen in Table 5 that, besides writing or over-labelling, printing of a radiation curable ink-jet ink on the inventive sample INV-1 was not possible in order to provide a new layer comprising falsified information on top of the outermost layer.

The inventive sample INV-2 shows that in the case of an ink-receiver with a polymer blend type top layer, it was possible to obtain a tamperproof ID document by jetting the curable liquid comprising the abherent agent directly on the ink-receiver with applying a cured layer of curable liquid first.

The same results were obtained with an EPSON PHOTO STYLUS™ R300 ink jet printer using dye based ink-jet inks instead of an EPSON PHOTO STYLUS™ R800 ink jet printer using pigmented ink-jet inks.

Example 2

This example illustrates which amount of abherent agent in the curable liquid for forming the outermost layer is required in order to obtain secure ID documents.

The SCOTCHGARD™ Phototool Protector solution comprises about 60 wt % of γ-glycidoxypropyl trimethoxysilane as abherent agent, no colorants and triphenylsulfonium hexafluoro-antimonate as cationic photoinitiator. The SCOTCHGARD™ Phototool Protector solution was diluted by adding the monofunctional Actilane™ 411 monomer according to Table 6 and used to prepare the inventive samples INV-3 to INV-5 and comparative sample COMP-4 in the same manner as inventive sample INV-1 was prepared in EXAMPLE 1

TABLE 6

| Sample | SCOTCHGARD ™ Phototool Protector solution | Actilane ™ 411 diluent monomer | Amount of abherent agent |
| --- | --- | --- | --- |
| INV-1 | 100 wt % | 0 wt % | >60 wt % |
| INV-3 | 80 wt % | 20 wt % | >48 wt % |
| INV-4 | 60 wt % | 40 wt % | >36 wt % |
| INV-5 | 40 wt % | 60 wt % | >24 wt % |
| COMP-4 | 20 wt % | 80 wt % | >12 wt % |

Results and Evaluation:

The comparative samples COMP-2 and COMP-4 and the inventive samples INV-1 and INV-3 to INV-5 were tested in the same way as in EXAMPLE 1 on their adhesion and their possibilities of falsification. The results are shown in Table 7.

TABLE 7

| Sample | Amount of abherent agent | Adhesion | Writing & erasability test | | | | Label test |
| --- | --- | --- | --- | --- | --- | --- | --- |
| | | | Pen 1 | Pen 2 | Pen 3 | Pen 4 | |
| INV-1 | >60 wt % | OK | 1 | 1 | 1 | 1 | − |
| INV-3 | >48 wt % | OK | 1 | 2 | 1 | 1 | − |
| INV-4 | >36 wt % | OK | 2 | 2 | 1 | 2 | − |
| INV-5 | >24 wt % | OK | 3 | 2 | 2 | 2 | − |
| COMP-4 | >12 wt % | OK | 6 | 4 | 4 | 6 | + |
| COMP-2 | 0 wt % | OK | 6 | 6 | 6 | 6 | + |

From Table 7 it should be clear that the curable liquid comprising 24 wt % or more of the abherent agent delivered samples secured against falsification.

The same results were obtained with an EPSON PHOTO STYLUS™ R300 ink jet printer using dye based ink-jet inks instead of an EPSON PHOTO STYLUS™ R800 ink jet printer using pigmented ink-jet inks.

Example 3

This example illustrates that overprinting with electrophotographic toner can be prevented by using an abherent agent in the outermost layer of a curable liquid on an ink-receiver.

An image comprising text and pictures was printed on an A4-size comparative sample COMP-2 and an A4-size inventive sample INV-1 of EXAMPLE 1 in a HP LaserJet™ 4250tn printer equipped with a HP LaserJet™ Q5942X toner cassette.

The adhesion properties of the electrophotographic toner image towards the top-surfaces of both ink-receivers were compared. In the comparative sample COMP-2 lacking an abherent agent, the toner image adhered very well on the top-surface and it was very difficult to scratch it away, while the toner image was easily scratched away in the inventive sample INV-1.

Example 4

This example illustrates that the method for preventing falsification can be applied to a wide range of commercially available security cards (ID-cards, healthcare cards, employee cards).

The SCOTCHGARD™ Phototool Protector formulation was jetted on the image-bearing side of the security cards Card 1 to Card 8 listed in Table 8 with a custom built ink-jet printer equipped with an :UPH print head from AGFA. A resolution of 360×360 dpi was used to print at 8 dpd (droplets per dot), wherein 1 dpd was equal to a droplet volume of 3 pL.

TABLE 8

| | Card Samples | Maunfacturer | Printing System |
|---|---|---|---|
| Card 1 | Atlantic Travel ID-card | Fargo | Fargo CardJet ™ 410 printer/encoder |
| Card 2 | Personal health insurance card | Datacard Group | Datacard ™ 9000e Series |
| Card 3 | Demo card | Schlumberger | Evolis ™ Card Printer |
| Card 4 | Driving Licence | Zebra Technologies Corporation | Zebra ™ Plastic Card Printer |
| Card 5 | Demo card | DCS Europe/ Polaroid | Polaroid ™ i series printer |
| Card 6 | Employee demo-ID card | Gemplus | "SafesITe" ™ system |
| Card 7 | National health care card | Datacard Group | Datacard MPR5000 |
| Card 8 | Access card | Zebra Technologies Corporation | Zebra ™ PS20 |

The jetted samples were cured using a Fusion DRSE-120 conveyer, equipped with a Fusion VPS/I600 lamp (D-bulb 240 W/cm), which transported the samples under the UV lamp on a conveyer belt at a speed of 33.5 cm/s to deliver the inventive samples INV-6 to INV-13.

The original cards 1 to 8 served as comparative samples COMP-5 to COMP-12.

The abherent properties of the comparative samples COMP-5 to COMP-12 and the inventive samples INV-6 to INV-13 were compared using the writing & erasability test with Pen 4 (Corporate Express™ Chisel Tip Highlighter) and Pen 5, a Corporate Express™ Permanent marker (Code 208 00 97) from CORPORATE EXPRESS. The results of the test are shown in Table 9.

From Table 9, it is clear that the image on the inventive samples INV-6 to INV-13 comprising an abherent agent in the outermost layer could not be altered by writing on the outermost layer.

TABLE 9

| | | Abherent | Writing & erasability test | |
|---|---|---|---|---|
| Sample | Card samples | agent | Pen 4 | Pen 5 |
| COMP-5 | Card 1 | No | 6 | 6 |
| COMP-6 | Card 2 | No | 4 | 6 |
| COMP-7 | Card 3 | No | 4 | 6 |
| COMP-8 | Card 4 | No | 4 | 6 |
| COMP-9 | Card 5 | No | 4 | 6 |
| COMP-10 | Card 6 | No | 4 | 6 |
| COMP-11 | Card 7 | No | 3 | 6 |
| COMP-12 | Card 8 | No | 4 | 5 |

TABLE 9-continued

| | | Abherent | Writing & erasability test | |
|---|---|---|---|---|
| Sample | Card samples | agent | Pen 4 | Pen 5 |
| INV-6 | Card 1 | Yes | 1 | 1 |
| INV-7 | Card 2 | Yes | 1 | 2 |
| INV-8 | Card 3 | Yes | 1 | 1 |
| INV-9 | Card 4 | Yes | 1 | 1 |
| INV-10 | Card 5 | Yes | 1 | 2 |
| INV-11 | Card 6 | Yes | 1 | 1 |
| INV-12 | Card 7 | Yes | 1 | 1 |
| INV-13 | Card 8 | Yes | 1 | 2 |

Having described in detail the current invention, it will now be apparent to those skilled in the art that numerous modifications can be made therein without departing from the scope of the invention as defined in the appending claims.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:
1. An ID document comprising:
   (a) a support chosen from paper and polymeric supports to which has been applied one or more ink-receiving layers comprising at least a polymeric binder;
   (b) an outermost layer at least partially covering an image on said ID document containing a polymeric abherent agent and wherein the surface of an outermost layer at least partially covering said image on said ID document has a surface energy of less than 28 mJ/m$^2$;
   and wherein an intermediate cured polymeric layer free of a polymeric abherent is present if the one or more ink-receiving layers are porous ink-jet ink-receiving layers, and
   wherein the intermediate cured polymeric layer free of a polymeric abherent agent is optionally present if the one or more ink-receiving layers are polymer blend ink-jet ink-receiving layers.

2. The ID document according to claim 1, wherein said cured outermost layer comprises said polymeric abherent agent selected from the group consisting of polymers of dimethylsiloxane acrylate, copolymers of dimethylsiloxane acrylate, dimethyl siloxane modified polyethers, polymers of silicone-modified (meth)acrylates, copolymers of silicone-modified (meth)acrylates, dimethyl siloxane modified polyesters, silicone glycol copolymers, polymers of epoxy-functional silane compounds and copolymers of epoxy-functional silane compounds.

3. The ID document according to claim 2, wherein said epoxy-functional silane compound is selected from the group consisting of γ-glycidoxypropyl trimethoxysilane, γ-glycidoxypropyl triethoxysilane, β-glycidoxyethyl trimethoxysilane, γ-(3,4-epoxycyclohexyl)propyl trimethoxysilane and γ-(3,4-epoxycyclohexyl)ethyl trimethoxysilane.

4. A method for preparing a tamperproof ID document according to claim 1 comprising in order the steps of
   a) providing an ID document having at least one image on at least one outermost surface of said ID document;
   b) printing or coating a curable liquid on at least one of said outermost surfaces of said ID document thereby forming an outermost layer on said printed or coated outermost surface at least partially covering said at least one image; and
   c) curing said outermost layer;
   wherein said curable liquid comprises a polymerizable and/or a polymeric abherent agent and said printed or coated outermost surface is the surface of a layer or foil exclusive of porous pigment.

5. The method for preparing a tamperproof ID document according to claim 4, wherein said curable liquid comprises a silicon modified or a fluorinated polymerizable compound as abherent agent.

6. The method for preparing a tamperproof ID document according to claim 4, wherein said printing is by jetting.

7. The method for preparing a tamperproof ID document according to claim 6, wherein the curable liquid is a curable ink-jet ink for jetting the outermost part of the image or another image on said ID document.

8. The method for preparing a tamperproof ID document according to claim 6, wherein the abherent agent or a mixture of abherent agents is present in an amount between 20 and 99.6 wt % based on the total weight of the curable liquid.

9. The method for preparing a tamperproof ID document according to claim 4, wherein said abherent agent is selected from the group consisting of silicone-modified (meth)acrylates and epoxy-functional silane compounds.

10. The method for preparing a tamperproof ID document according to claim 9, wherein said epoxy-functional silane compound is selected from the group consisting of γ-glycidoxypropyl trimethoxysilane, γ-glycidoxypropyl triethoxysilane, β-glycidoxyethyl trimethoxysilane, γ-(3,4-epoxycyclohexyl)propyl trimethoxysilane and β-(3,4-epoxycyclohexyl)ethyl trimethoxysilane.

11. The method for preparing a tamperproof ID document according to claim 4, wherein said cured outermost layer comprises a polymeric abherent agent selected from the group consisting of polymers of dimethylsiloxane acrylate, copolymers of dimethylsiloxane acrylate, dimethyl siloxane-modified polyethers, dimethyl siloxane modified polyesters and silicone glycol copolymers.

12. The method for preparing a tamperproof ID document according to claim 4, wherein said abherent agent is selected from the group consisting of fluorinated (meth)acrylates and fluorinated ethylenes.

13. The method for preparing a tamperproof ID document according to claim 12, wherein said fluorinated (meth)acrylate is selected from the group consisting of 2,2,2-trifluoroethyl-α-fluoroacrylate (TFEFA), 2,2,2-trifluoroethyl-methacrylate (TFEMA), 2,2,3,3-tetrafluoropropyl-α-fluoroacrylate (TFPFA), 2,2,3,3-tetrafluoropropyl-methacrylate (TFPMA), 2,2,3,3,3-pentafluoropropyl-α-fluoroacrylate (PFPFA), 2,2,3,3,3-pentafluoropropyl-methacrylate (PFPMA), 1H,1H-perfluoro-n-octyl acrylate, 1H,1H-perfluoro-n-decyl acrylate, 1H,1H-perfluoro-n-octyl methacrylate, 1H,1H-perfluoro-n-decyl methacrylate, 1H,1H,6H,6H-perfluoro-1,6-hexanediol diacrylate, 1H,1H,6H,6H-perfluoro-1,6-hexanediol dimethacrylate, 2-(N-butylperfluorooctanesulfonamido)ethyl acrylate, 2-(N-ethyl perfluorooctanesulfonamido) ethyl acrylate, 2-(N-ethyl perfluorooctanesulfonamido) ethyl methacrylate, $C_8F_{17}CH_2CH_2OCH_2CH_2$—OOC—CH=CH$_2$ and $C_8F_{17}CH_2CH_2OCH_2CH_2$—OOC—C(CH$_3$)=CH$_2$.

14. The method for preparing a tamperproof ID document according to claim 4, wherein said cured outermost layer comprises a polymeric abherent agent selected from the group consisting of a polytetrafluoroethylene, copolymers of fluorinated ethylene, polymers of fluorinated (meth)acrylates, copolymers of fluorinated (meth)acrylates, perfluoro (alkyl vinyl ether)s and polyvinylidene fluoride.

15. The method for preparing a tamperproof ID document according to claim 4, wherein said curable liquid comprises at least one compound selected from the group consisting of a colorant, a fluorescent compound, a phosphorescent compound, an iridescent compound and a magnetic particle.

16. The method for preparing a tamperproof ID document according to claim 4, wherein said curable liquid is an optically variable ink.

17. The method for preparing a tamperproof ID document according to claim 4, wherein said outermost layer is formed on the front side and the backside of the ID document.

18. The ID document according to claim 1, wherein said cured outermost layer comprises a polymeric abherent agent selected from the group consisting of polymers of fluorinated (meth)acrylates, copolymers of fluorinated (meth)acrylates, polymers of polytetrafluoro-ethylene, copolymers of fluorinated ethylene, polymers of fluorinated ethylene, polymers of perfluoro(alkyl vinyl ether), copolymers of perfluoro(alkyl vinyl ether) and polyvinylidene fluoride.

19. The ID document according to claim 18, wherein said fluorinated (meth)acrylate is selected from the group consisting of 2,2,2-trifluoroethyl-α-fluoroacrylate (TFEFA), 2,2,2-trifluoroethyl-methacrylate (TFEMA), tetrafluoropropyl-α-fluoroacrylate (TFPFA), 2,2,3,3-tetrafluoropropyl-methacrylate (TFPMA), 2,2,3,3,3-pentafluoropropyl-α-fluoroacrylate (PFPFA), 2,2,3,3,3-pentafluoropropyl-methacrylate (PFPMA), 1H,1H-perfluoro-n-octyl acrylate, 1H,1H-perfluoro-n-decyl acrylate, 1H,1H-perfluoro-n-octyl methacrylate, 1H,1H-perfluoro-n-decyl methacrylate, 1H,1H,6H,6H-perfluoro-1,6-hexanediol diacrylate, 1H,1H,6H,6H-perfluoro-1,6-hexanediol dimethacrylate, 2-(N-butylperfluorooctanesulfonamido)ethyl acrylate, 2-(N-ethyl perfluorooctanesulfonamido) ethyl acrylate, 2-(N-ethyl perfluorooctanesulfonamido) ethyl methacrylate, $C_8F_{17}CH_2CH_2OCH_2CH_2$—OOC—CH=$CH_2$ and $C_8F_{17}CH_2CH_2OCH_2CH_2$—OOC—C($CH_3$)=$CH_2$.

20. A process for preparing ID-documents with a substantially non-printable and substantially non-laminatable adhesive surface according to claim 1, comprising providing and curing an abherent agent-comprising curable composition as an outermost surface layer.

* * * * *